(12) United States Patent
Pruuden et al.

(10) Patent No.: US 7,065,363 B1
(45) Date of Patent: Jun. 20, 2006

(54) ROUTING IN A NETWORK

(75) Inventors: Peeter Pruuden, Tampere (FI); Janne Jouni Kallio, Ylöjärui (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/009,215

(22) PCT Filed: May 8, 2000

(86) PCT No.: PCT/IB00/00704

§ 371 (c)(1),
(2), (4) Date: Apr. 3, 2002

(87) PCT Pub. No.: WO98/52375

PCT Pub. Date: Nov. 19, 1998

(30) Foreign Application Priority Data

May 10, 1999 (GB) ............................ 9910798
Oct. 15, 1999 (GB) ............................ 9924517

(51) Int. Cl.
*H04Q 7/20* (2006.01)
*H04Q 7/00* (2006.01)
*H04B 1/38* (2006.01)
*H04M 1/00* (2006.01)

(52) U.S. Cl. ................ 455/445; 455/436; 455/439; 455/452.2; 455/550.1; 455/560; 455/561; 455/554.2; 370/332

(58) Field of Classification Search ............ 455/422.1, 455/424–425, 426.1, 426.2, 428, 432.1, 432.2, 455/432.3, 433, 436–445, 450, 452.1, 452.2, 455/453, 463, 464, 466, 553.1, 550.1, 552.1, 455/554.1, 554.2, 560–561, 555; 370/237, 370/338, 313, 331–333
See application file for complete search history.

(56) References Cited

U.S. PATENT DOCUMENTS

| 5,737,365 | A   |   | 4/1998  | Gilbert et al. ............... 375/224    |
| 6,038,452 | A   | * | 3/2000  | Strawczynski et al. ..... 455/446        |
| 6,263,207 | B1  |   | 7/2001  | Kito ........................... 455/453 |
| 6,324,170 | B1  |   | 11/2001 | McClennon et al. ........ 370/286        |
| 6,452,915 | B1  |   | 9/2002  | Jorgensen .................... 370/338   |
| 6,539,205 | B1  |   | 3/2003  | Wan et al. ................... 370/465   |
| 6,591,382 | B1  |   | 7/2003  | Molloy et al. .............. 714/704     |
| 6,628,943 | B1  |   | 9/2003  | Agrawal et al. ......... 455/432.1       |
| 6,654,359 | B1  |   | 11/2003 | La Porta et al. ............ 370/328     |
| 6,771,609 | B1  | * | 8/2004  | Gudat et al. ................ 370/254    |

* cited by examiner

*Primary Examiner*—William Trost
*Assistant Examiner*—Meless Zewdu
(74) *Attorney, Agent, or Firm*—Cohen, Pontani, Lieberman & Pavane

(57) ABSTRACT

A telecommunications system comprising: a first base station and a second base station, both capable of communicating by radio with a first terminal unit; a telecommunications network capable of coupling the first base station to a second terminal unit over a first route and capable of coupling the second base station to the second terminal unit over a second route, whereby traffic data may be communicated between the first terminal unit and the second terminal unit via the first base station or the second base station; and a routing unit for determining whether the first terminal unit is to communicate with the second terminal unit via the first and second base stations in dependence on factors that include quality of at least part of the first and second routes.

38 Claims, 2 Drawing Sheets

ROUTING IN A NETWORK

FIELD OF THE INVENTION

Priority Claim

This is a national stage of PCT application No. PCT/IB00/00704, filed on May 8, 2000. Priority is claimed on that application and on Great Britain Application No. 9910798.9, filed May 10, 1999; and Great Britain Application No. 9924517.7 filed Oct. 15, 1999.

BACKGROUND OF THE INVENTION

FIG. 1 shows schematically the configuration of a typical wireless cellular telecommunications network. The network comprises a number of base-stations (BSs) 4, 5, 6 etc. Each base-station has a radio transceiver capable of transmitting radio signals to and receiving radio signals from the area of an associated cell 1, 2, 3 etc. By means of these signals the base-stations can communicate with a terminal 9 which may be a mobile station (MS) in the associated cell. That terminal itself includes a radio transceiver. Each base station is connected via a base station controller (BSC) 7 to a mobile switching centre (MSC) 8, which is linked in turn to the public telephone network (PSTN) 10. By means of this system a user of the mobile station 9 can establish a telephone call to the public network 10 via the base station in whose cell the mobile station is located. The location of the terminal 9 could be fixed (for example if it is providing radio communications for a fixed building) or the terminal could be moveable (for example if it is a hand portable transceiver or mobile phone).

If the mobile 9 moves from one cell to another there is a need for it to switch from communicating with one base station to communicating with another. This process is known as handover. As an example, at location 11 the mobile 9 communicates with base station 4. if the mobile 9 moves from location 11 to location 12 along route 13 then at some point it must hand over from communicating with base station 4 to communicating with at least one of base stations 5 and 6. When the mobile station 9 is communicating via base station 4 with another terminal unit 14 the communications data passes across the radio link between the mobile and the base station 4, fixed wire link 15 between the base station 4 and the corresponding BSC 7 and then onward to terminal 14.

As the mobile moves from one cell to another the decision on when to hand over, and to which base station to hand over, is conventionally based on estimates of the quality of the radio links between the mobile and each of the candidate base stations, including the one with which it is currently communicating. A number of measures of quality are available; examples of available measures include frame error rate, bit error rate, signal to noise or signal to interference rate (SNR or SIR), received power of one unit at the other and path loss. These measurements may be made for communications in either or both directions across the radio link. The handover process may be initiated or requested by the mobile station but it is normal for the ultimate decision on when to hand over to be taken on the network side of the air interface. This is because the network has knowledge of which of the candidate base stations has available capacity for communicating with the mobile and can take this, in addition to link quality, into account in making the handover decision. Therefore, mobile stations are normally required to report to the network the results of their quality measurements of the candidate base stations. The result in most systems is that—subject to relatively minor sources of error such as rapid variations in quality that are not accommodated due to delays in the handover process and subject to network constraints such as capacity—the link quality between the mobile and the unit with which it is communicating is kept substantially optimised.

Moves are being made to integrate networks of the type shown in FIG. 1 with other signalling networks such as intranets or the internet. This has the advantage that it may avoid the need to install dedicated synchronous links for the mobile network. Instead, using a protocol such as H.323 voice traffic from one terminal to another can be sent over existing packet switched links. These links may, for instance be between a base station and its BSC or between a BSC and the remainder of the network. This has significant advantages in reduced cost of setting the network up and maintaining it. Also, if the network is, for example, a company's intranet then it can be used to route calls within the company without the need for the company to pay a network operator for the use of an external network. However, problems may be encountered with handover in such a system. When a mobile station is handed over from one base station to another its user may experience a significant decrease in performance because, although the radio link to the new base station is better than that to the old base station, there are other problems in the network that cause the network-side links to the new base station to be worse. These problems could, for example, be high usage of the network in the region of the new base station or its BSC that results in packet loss, or routing of packets to or from the new base station by a long route that introduces delays or jitter.

There is thus a need to improve handover performance in telecommunications networks.

SUMMARY OF THE INVENTION

According to one aspect of the present invention there is provided a telecommunications system comprising: a first base station and a second base station, both capable of communicating by radio with a first terminal unit; a telecommunications network capable of coupling the first base station to a second terminal unit over a first route and capable of coupling the second base station to the second terminal unit over a second route, whereby traffic data may be communicated between the first terminal unit and the second terminal unit via the first base station or the second base station; and a routing unit for determining whether the first terminal unit is to communicate with the second terminal unit via the first or second base stations in dependence on factors that include quality of at least part of the first and second routes.

According to another aspect of the present invention there is provided a method for determining routing in a telecommunications system comprising: a first base station and a second base station, both capable of communicating by radio with a first terminal unit, and a telecommunications network capable of coupling the first base station to a second terminal unit over a first route and capable of coupling the second base station to the second terminal unit over a second route, whereby traffic data may be communicated between the first terminal unit and the second terminal unit via the first base station or the second base station; the method comprising: estimating the quality of at least part of the first and second routes; and determining whether the first terminal unit is to communicate with the second terminal unit via the first or second base stations in dependence on factors that include the said quality.

The quality is suitably communication quality, preferably as estimated by one or more of the following measures: error rate, re-transmission rate, loss rate, delay or jitter of any of bits, frames, packets or other data units.

The routing unit may suitably be capable of initiating, requesting or beginning handover of radio communications (most preferably traffic communications) between the first terminal unit and the base stations from one of the base stations to the other in dependence on factors that include the quality of at least part of the first and second routes. The routing unit may suitably be capable of routing initial radio communications (most preferably initial traffic communications) between the first terminal unit and one of the base stations to the other in dependence on factors that include the quality of at least part of the first and second routes.

Preferably the said factors include the quality of at least part of both the first and second routes, most preferably of all the parts of those routes that are not common to both routes. The said factors may include non-quality factors such as expected cost.

The routing unit is suitably capable of comparing the quality of the first and second routes and making the determination that the first terminal unit is to communicate with the second terminal unit via the first or second base stations in dependence on that comparison. The said factors may include the quality of radio communications between the first terminal and at least one of the first and second base stations.

Preferably the telecommunications system comprises quality estimation apparatus for estimating the quality of at least part of the first and second routes and providing an indication of that quality to the routing unit. That indication of estimated quality may be the quality factor described above. The estimation of quality may be derived from a communication protocol such as RTCP (real-time control protocol).

At least part of the first and second routes may be implemented by packet-based communications links or other links over which quality of service is not guaranteed.

The system may be a cellular telephony telecommunications system. It may operate according to the GSM standard or a derivative thereof.

The first terminal unit may, for instance, be a mobile phone or a wireless LAN (local area network) terminal.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The present invention will now be described by way of example, with reference to the accompanying drawings, in which.

DETAILED DESCRIPTION OF THE PRESENTLY PREFERRED EMBODIMENTS

Figure 1:
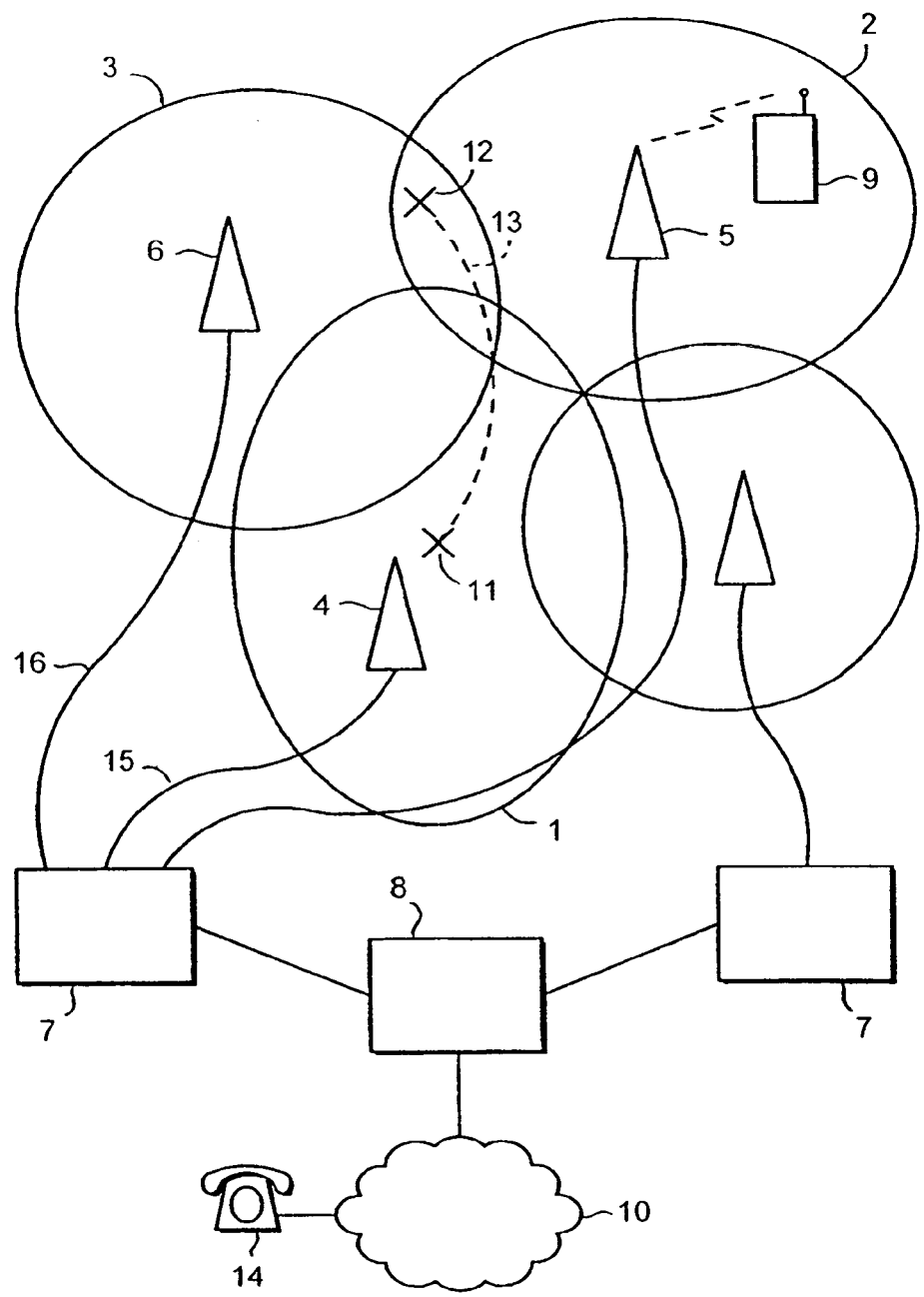
FIG. 1 is a schematic diagram of a prior art telecommunications network.
Figure 2:
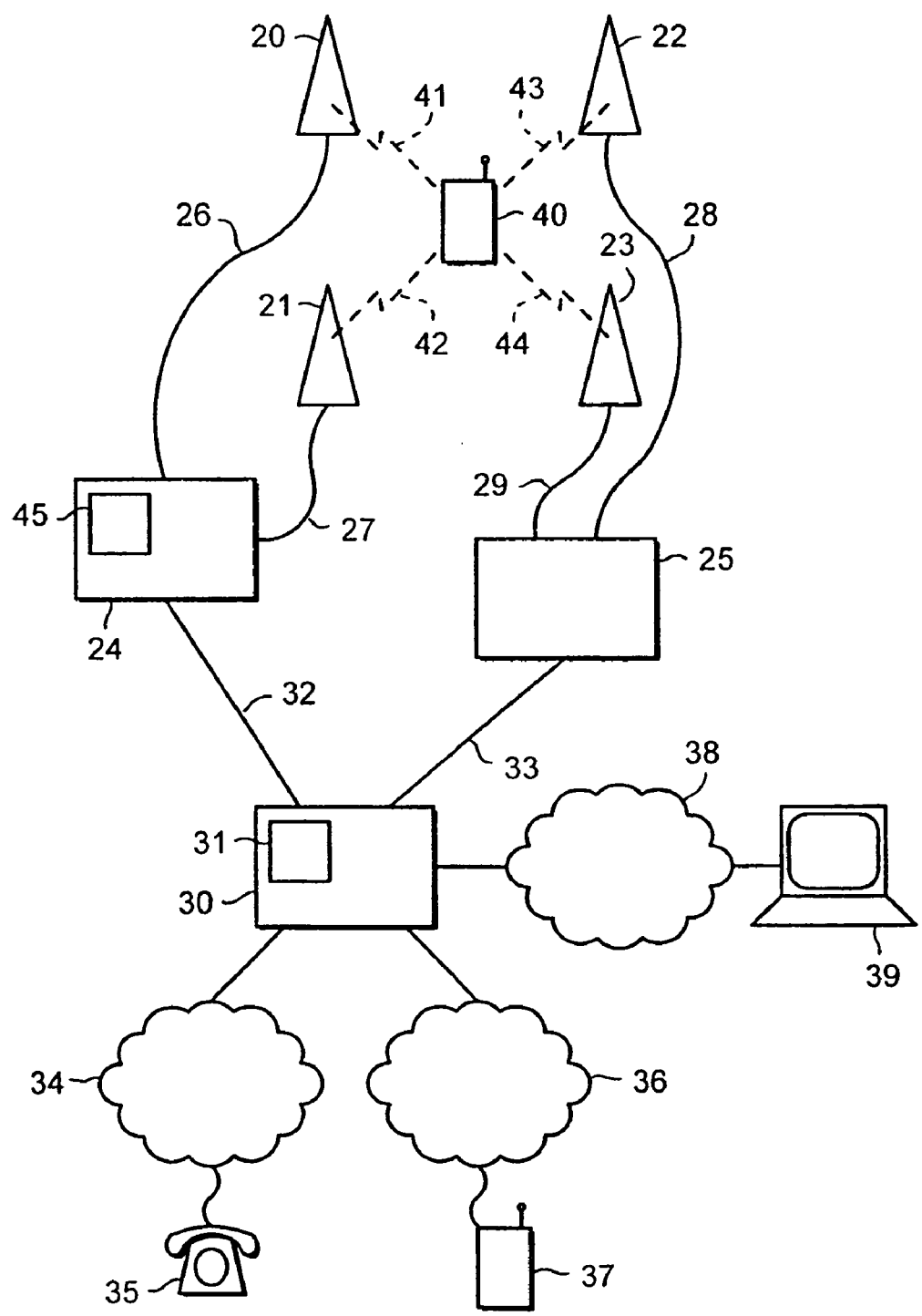
FIG. 2 is a schematic diagram of a telecommunications network according to an embodiment of the present invention.

FIG. 2 shows a telecommunications network including base stations 20–23. Base stations 20 and 21 are controlled by base station controller 24 and are linked to that BSC by communication links 26, 27 respectively. Base stations 22 and 23 are controlled by base station controller 25 and are linked to that BSC by communication links 28, 29 respectively. The BSCs 24, 25 are under the control of what may be termed a network controller 30, which implements the normal network control functions, including handover control which is implemented by handover control unit 31. The network controller 30 could be an MSC or a gateway unit. The BSCs 24, 25 are linked to the network controller by communication links 32, 33 respectively. The BSCs 24, 25 may be "Intranet Mobile Cluster" units that could perform functions of typical base station controllers together with other intranet functions. The network controller 30 is linked to a public telephone network 34 to allow calls to be placed to and received from terminals 35 attached to the network 34, to a cellular telephone network 36 for exchange of signalling information and to allow calls to be placed to and received from terminals 37 attached to the network 36, and to a data network 38 such as the internet to allow connections (including voice-over-IP connections) to be made with terminals such as personal computer 39 attached to the network 38.

The base stations 20–23 are capable of communicating by radio with a mobile station 40 over radio links 41–44 respectively. Thus, a user of the terminal 40 can communicate over the network with a user of any of the terminals 35, 37 and 39.

In the present system at least some of the links 26–29, 32 and 33 might be implemented as part of a packet switched network, or by some other means over which the quality of service is not guaranteed to the level that may normally be expected of the analogous analogue or digital fixed links in a conventional cellular telecommunications network. One example is by means of a LAN (local area network), which could be an intranet.

As the mobile 40 moves around, the quality of the radio links 41–44 changes and a need may arise for handover of the mobile station from one base station to another. For instance, if the mobile is in the vicinity of base station 20 and is communicating with terminal 37 by the route (referring to FIG. 2):

41, 20, 26, 24, 32, 30, 36, 37;

and moves towards base stations 22 and 23 the need may arise to hand over the mobile to base station 22, when it would communicate with terminal 37 by the route:

43, 22, 28, 25, 33, 30, 36, 37;

or to base station 23, when it would communicate with terminal 37 by the route:

44, 23, 29, 25, 33, 30, 36, 37.

The handover control unit 31 takes the decisions on when to hand over from base station 20, and to which of the base stations 22, 23 the handover is to be. In making that decision in the present system account is taken not just of the quality of the radio links of the alternative routes between the mobile station that may be handed over and the base stations to which it can communicate (radio links 41, 42, 43) but also of the quality of the other segments that differ between the available routes: the quality of fixed links 26, 32, 28, 29 and 33, and also the performance of the units that lie in those routes. By this means the likelihood of the handover being made so as to optimise service to the user of the terminal 40 can be greatly increased.

This decision process will now be described in more detail.

The handover decision is taken by the handover control unit 31. In the present system this is located at the network controller 30 but in practice it could be located wherever is most convenient; and it could be implemented in a distributed form throughout the system, e.g. by means of functionality at base station controllers. The handover control unit 31 takes handover decisions using information it has received on the quality of communications. This information includes information on the quality of other communications paths than just that over the air interface with the mobile that is the subject of a handover decision.

One way for the information to be gathered is by the handover control unit estimating the individual quality of some or all of the links in the available routes (or even some or all of just the links that differ between the available routes). This may be done continuously or periodically or in response to a handover request generated by another unit in the system, such as the mobile station 40, when it detects a deterioration in quality. Another way for the information to be gathered is for a sounding to be taken over all or part of each available route between the subject mobile and a node that the available routes have in common, which could even be the remote terminal (here terminal 37 for instance). This sounding may be taken by one or other of the terminals 40, 37 transmitting data over each path that is to be sounded and the quality of that communication being monitored over part or all of its route. The sending of sounding or test data may be carried out without involving the mobile but specifically between nodes of the network, especially between nodes of a digital (e.g. packet) network.

The quality of the links may be estimated on any available measure. Some available measures include:

1. Error rate, for instance the proportion of selected units such as bits, frames, packets or messages that are conveyed to within a certain accuracy (e.g. perfectly). This may be estimated by a dedicated unit or might be derived more easily from the protocol that is used, for instance by monitoring the number of re-transmissions that take place. The error rate may also reflect total loss of data within a certain time limit.
2. Speed of communications, for example the time taken for a communication to pass from one end of the path under test to the other.
3. Consistency of any delay—it may be desired to reduce jitter and aim for a more consistent delay over the path that is to be used.
4. The perceived quality of the path under test may be influenced by network issues such as loading over the path that may statistically be expected to be indicators of greater anticipated delays over the path.
5. Measures of the physical characteristics of the path may also be used as an indication of quality. These may include the required transmission power over the path, the path loss over the path, the available bit rate over the path (and potentially its relation to the required power), and the physical length of the path.

As indicated above, some transmission protocols provide convenient means to estimate aspects of communications quality. For example, RTP (real-time transfer protocol) supports RTCP (real-time control protocol) which gives measured values for quality measures such as delay and packet loss rate by means of sender or receiver packet reports. This approach might not allow for measurement of the quality of an individual link since the chosen protocol might only provided for end-to-end quality measurement; and in that case the quality indications derived from the protocol would depend on what stretch the protocol was being run over. Alternatively a measurement unit may be used to snoop on a link in order to estimate communication quality over the link.

Where the quality measurement is not done at the handover control unit 31 there is a need for the results of the measurement to be transmitted to the handover control unit. The handover control unit may also need to send instructions to other units (for instance base stations or the subject mobile station) to carry out measurements or to make data transmissions or connections whose quality can then be measured.

The handover control unit could continuously or periodically monitor quality so as to detect when a handover might be needed and/or it could respond to handover requests initiated by other units in the system. In either case, the handover control unit makes its decision using some or all of the available information with a handover decision algorithm. The decision algorithm may take account of other factors than link quality, such as cost of use of a communication link or (even if this is unrelated to communication quality) network load in parts of the system.

A specific example of a decision process will be described with reference to FIG. 2. As the mobile station 40 moves towards base stations 22 and 23 and away from base station 20 it detects a reduction in signal to interference ratio over its radio link 41 and an increase in the quality with which it receives broadcast signals from base stations 22 and 23. This causes it to transmit a handover request signal to base station 20. Base station 20 forwards the handover request via base station controller 24 to the handover control unit 31 which must make a decision on which of the three routes:

40, 41, 20, 26, 24, 32, 30, 36, 37;

40, 43, 22, 28, 25, 33, 30, 36, 37; or

40, 44, 23, 29, 25, 33, 30, 36, 37;

is now to be used. The handover control unit 31 sends a signal to mobile station 40 to instruct it to send a first test data stream which is routed to network controller 30 over route 43, 22, 28, 25, 33 and a second test data stream which is routed to network controller 30 over route 44, 23, 29, 25, 33. The quality with which these streams are received is monitored by the handover control unit using one or more of the measures described above. The test data streams can be sent by the mobile station at moments when it would otherwise have been idle, so the call to terminal 37 can be maintained whilst the test is in progress. Meanwhile the handover control unit 31 also monitors the quality of the call data as it is sent via the network controller over route 41, 20, 26, 24, 32. The handover control unit 31 determines which of these routes has the highest quality using the metric defined in its quality assessment algorithm. If the chosen route is via base station 22 or 23 then, subject to network constraints such as ensuring that there is sufficient capacity on the chosen link to accommodate the call from mobile 40, the handover control unit 31 sends a signal to base station 20 to cause a handover to the chosen base station.

Another method would be for nodes in a packet network that reside at or near the edge of the radio network to be instructed to perform sending of test data streams on selected routes. Such test data is likely to be needed principally to generate measurable traffic over links that would otherwise be idle. If sufficient properly measurable traffic was already present then specific test data may not be needed.

In an alternative procedure following more closely the conventional GSM arrangement the following steps may take place:
1. Mobile station 40 measures the received signal strength (RSS) of all nearby base stations and sends that information to base station 20.
2. Base station 20 measures the received signal strength of mobile station 40.
3. Base station 20 transmits the measured signal strength information to handover control equipment 45 at base station controller 24.
4. Handover control equipment 45 receives information derived by means of RTCP that is to some extent indicative of the quality of the links 26, 32, 28, 29, 33 that differ between the available routes.
5. Handover control equipment 45 compares the expected quality of the available links by using an algorithm to combine the RSS and RTCP-derived information. If the link having the highest expected quality is via base station 22 or 23 and the expected quality of that link exceeds that of the current route via base station 20 by a pre-set margin then the handover control equipment 45 decides to request handover to the better link. (Suppose for this explanation that this better link is the link via base station 22). The handover control equipment 45 at base station controller 24 then sends a request for handover to base station controller 25.
6. Base station controller 25 can accept or reject the handover request.
7. If BSC 25 accepts the handover request then it returns a message to BSC 24 accepting the request and indicating the channel on which the new radio communication link between mobile station 40 and base station 22 is to be.
8. The BSC 25 sends a handover command message to mobile station 40, giving information on the channel that is to be used for the new radio link with base station 22.
9. The mobile station 40 switches to the new channel and hands over traffic communications to the new base station 22.
10. The BSC 25 sends a message to BSC 24 to indicate that handover is complete. (Up to that stage the BSC 24 remains ready to accept the mobile station 40 in case the handover fails).

The handover decision process could be triggered by deterioration of communication quality to below a threshold. Alternatively, where quality is monitored continuously or periodically it may be desired to set a threshold by which the quality of an alternative route must exceed the quality of the current route in order for handover to occur. This may help to avoid an excessive number of handovers occurring, which could give rise to wasteful additional signalling in the network. A similar result may be achieved by specifying a minimum time period between handovers.

The network could operate according to any appropriate specification, for example the GSM specification. The approach described above could be used in a system that allowed soft handover (in which one mobile station may simultaneously communicate traffic data via more than one base station) such as IS-95.

In addition to making handover decisions the handover control unit 31 could also be employed when a call from the mobile 40 is initially established, to determine which of a number of available base stations the mobile 40 should begin the call in communication with.

The decision making algorithm employed by the handover control unit in choosing a route could be predictive, for example to anticipate deteriorations in service due to expected increases in traffic or additional connections.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A telecommunication system comprising:
a first base station and a second base station, both capable of communicating by radio with a first terminal unit;
a telecommunication network capable of coupling the first base station to a second terminal unit over a first route and capable of coupling the second base station to the second terminal unit over a second route, whereby traffic data may be communicated between the first terminal unit and the second terminal unit via the first base station or the second base station, each of said first route and second route comprising at least one radio link segment and other non-radio link segments; and
a routing unit for deterring whether the first terminal unit is to communicate with the second terminal unit via the first or second base stations in dependence on factors that include quality of at least part of the first and second routes, wherein said at least a part of the first and second routes is at least one of the other non-radio link segments.

2. A telecommunication system as claimed in claim 1, wherein the routing unit is capable of initiating handover of radio communications between the first terminal unit and the base stations from one of the base stations to the other in dependence on factors that include the quality of at least part of the first and second routes.

3. A telecommunications system as claimed in claim 2, wherein the said factors include the quality of radio communications between the first terminal and at least one of the first and second base stations.

4. A telecommunications system as claimed in claim 2, comprising quality estimation apparatus for estimating the quality of at least part of the first and second routes and providing an indication of that quality to the routing unit.

5. A telecommunications system as claimed in claim 2, wherein at least part of the first and second routes is implemented by packet-based communications links.

6. A telecommunication system as claimed in claim 2, wherein the said factors include the quality of at least part of both the first and second routes.

7. A telecommunications system as claimed in claim 6, wherein the said factors include the quality of radio communications between the first terminal and at least one of the first and second base stations.

8. A telecommunications system as claimed in claim 6, comprising quality estimation apparatus for estimating the quality of at least part of the first and second routes and providing an indication of that quality to the routing unit.

9. A telecommunications system as claimed in claim 6, wherein the routing unit is capable of comparing the quality of the first and second routes and making the determination that the first terminal unit is to communicate with the second terminal unit via the first or second base stations in dependence on that comparison.

10. A telecommunications system as claimed in claim 9, wherein the said factors include the quality of radio communications between the first terminal and at least one of the first and second base stations.

11. A telecommunications system as claimed in claim 9, comprising quality estimation apparatus for estimating the quality of at least part of the first and second routes and providing an indication of that quality to the routing unit.

12. A telecommunication system as claimed in claim 1, wherein the said factors include the quality of at least part of both the first and second routes.

13. A telecommunications system as claimed in claim 12, wherein the said factors include the quality of radio communications between the first terminal and at least one of the first and second base stations.

14. A telecommunications system as claimed in claim 12, comprising quality estimation apparatus for estimating the quality of at least part of the first and second routes and providing an indication of that quality to the routing unit.

15. A telecommunications system as claimed in claim 12, wherein at least part of the first and second routes is implemented by packet-based communications links.

16. A telecommunication system as claimed in claim 12, wherein the routing unit is capable of comparing the quality of the first and second routes and making the determination that the first terminal unit is to communicate with the second terminal unit via the first or second base stations independence on that comparison.

17. A telecommunications system as claimed in claim 16, wherein the said factors include the quality of radio communications between the first terminal and at least one of the first and second base stations.

18. A telecommunications system as claimed in claim 16, comprising quality estimation apparatus for estimating the quality of at least part of the first and second routes and providing an indication of that quality to the routing unit.

19. A telecommunications system as claimed in claim 16, wherein at least part of the first and second routes is implemented by packet-based communications links.

20. A telecommunications system as claimed in claim 1, wherein the said factors include the quality of radio communications between the first terminal and at least one of the first and second base stations.

21. A telecommunications system as claimed in claim 20, comprising quality estimation apparatus for estimating the quality of at least part of the first and second routes and providing an indication of that quality to the routing unit.

22. A telecommunications system as claimed in claim 20, wherein at least part of the first and second routes is implemented by packet-based communications links.

23. A telecommunications system as claimed in claim 1, comprising quality estimation apparatus for estimating the quality of at least part of the first and second routes and providing an indication of that quality to the routing unit.

24. A telecommunications system as claimed in claim 23, wherein at least part of the first and second routes is implemented by packet-based communications links.

25. A telecommunication system as claimed in claim 23, wherein the estimation of quality is derived from a communication protocol.

26. A telecommunications system as claimed in claim 25, wherein at least part of the first and second routes is implemented by packet-based communications links.

27. A telecommunication system as claimed in claim 25, wherein the protocol is RTCP (real-time control protocol).

28. A telecommunications system as claimed in claim 27, wherein at least part of the first and second routes is implemented by packet-based communications links.

29. A telecommunications system as claimed in claim 1, wherein at least part of the first and second routes is implemented by packet-based communications links.

30. A telecommunication system as claimed in claim 1, wherein the quality of the at least part of the first and second routes is based on a measured error rate in the at least part of the first and second routes.

31. A telecommunication system as claimed in claim 1, wherein the quality of the at least part of the first and second routes is based on a speed of communications in the at least part of the first and second routes.

32. A telecommunication system as claimed in claim 1, wherein the quality of the at least part of the first and second routes is based on a consistency of a delay in the at least part of the first and second routes.

33. A telecommunication system as claimed in claim 1, wherein the quality of the at least part of the first and second routes is based on measured physical characteristics of the at least part of the first and second routes.

34. A method for determining routing in a telecommunication system comprising: a first base station and a second base station, both capable of communicating by radio with a first terminal unit, and a telecommunications network capable of coupling the first base station to a second terminal unit over a first route and capable of coupling the second base station to the second terminal unit over a second route, whereby traffic data may be communicated between the first terminal unit and the second terminal unit via the first base station or the second base station, each of the first and second routes comprising at least one radio link segment and other non-radio link segments; the method comprising:
estimating the quality of at least part of the first and second routes, wherein the at least a part of the first and second routes is at least one of the other non-radio link segments; and
determining whether the first terminal unit is to communicate with the second terminal unit via the first or second base stations independence on factors that include the quality.

35. The method of claim 34, wherein said step of estimating a quality comprises measuring quality based on a measured error rate in the at least part of the first and second routes.

36. The method of claim 34, wherein said step of estimating quality comprises determining a speed of communications in the at least part of the first and second routes.

37. The method of claim 34, wherein said step of estimating quality comprises measuring a consistency of a delay in the at least part of the first and second routes.

38. The method of claim 34, wherein said step of estimating quality comprises measuring physical characteristics of the at least part of the first and second routes.

* * * * *